United States Patent [19]

Small

[11] Patent Number: 5,157,495
[45] Date of Patent: Oct. 20, 1992

[54] MULTI-MODE VIDEO STANDARD SELECTION CIRCUIT AND SELECTION METHOD

[75] Inventor: Jeffrey A. Small, Rochester, N.Y.

[73] Assignee: Eastman Kodak Company, Rochester, N.Y.

[21] Appl. No.: 811,524

[22] Filed: Dec. 20, 1991

[51] Int. Cl.⁵ .............................................. H04N 5/46
[52] U.S. Cl. .................................. 358/188; 358/140
[58] Field of Search ................................ 358/140, 188

[56] References Cited

U.S. PATENT DOCUMENTS

| | | | |
|---|---|---|---|
| 4,860,098 | 8/1989 | Murphy | 358/188 |
| 4,962,427 | 10/1990 | Lunn | 358/188 |
| 4,962,428 | 10/1990 | Tong | 358/188 |
| 4,994,912 | 2/1991 | Lumelsky | 358/140 |
| 5,095,363 | 3/1992 | Zuffada | 358/188 |

Primary Examiner—Howard W. Britton
Attorney, Agent, or Firm—Edward Dugas

[57] ABSTRACT

A first embodiment of the present invention provides logic to select between one of three or more user entered video standards and one or more selectable default video standards. The logic overrides the default standard with the user selected standard. A second embodiment includes a state machine that sets a mode output to a default standard from among two or more standards specified at the factory using jumper pins. The state machine can step through the two or more available standard modes, thereby changing the picture displayed to the user and, as desired, allowing the user to indicate what standard should be used.

9 Claims, 4 Drawing Sheets

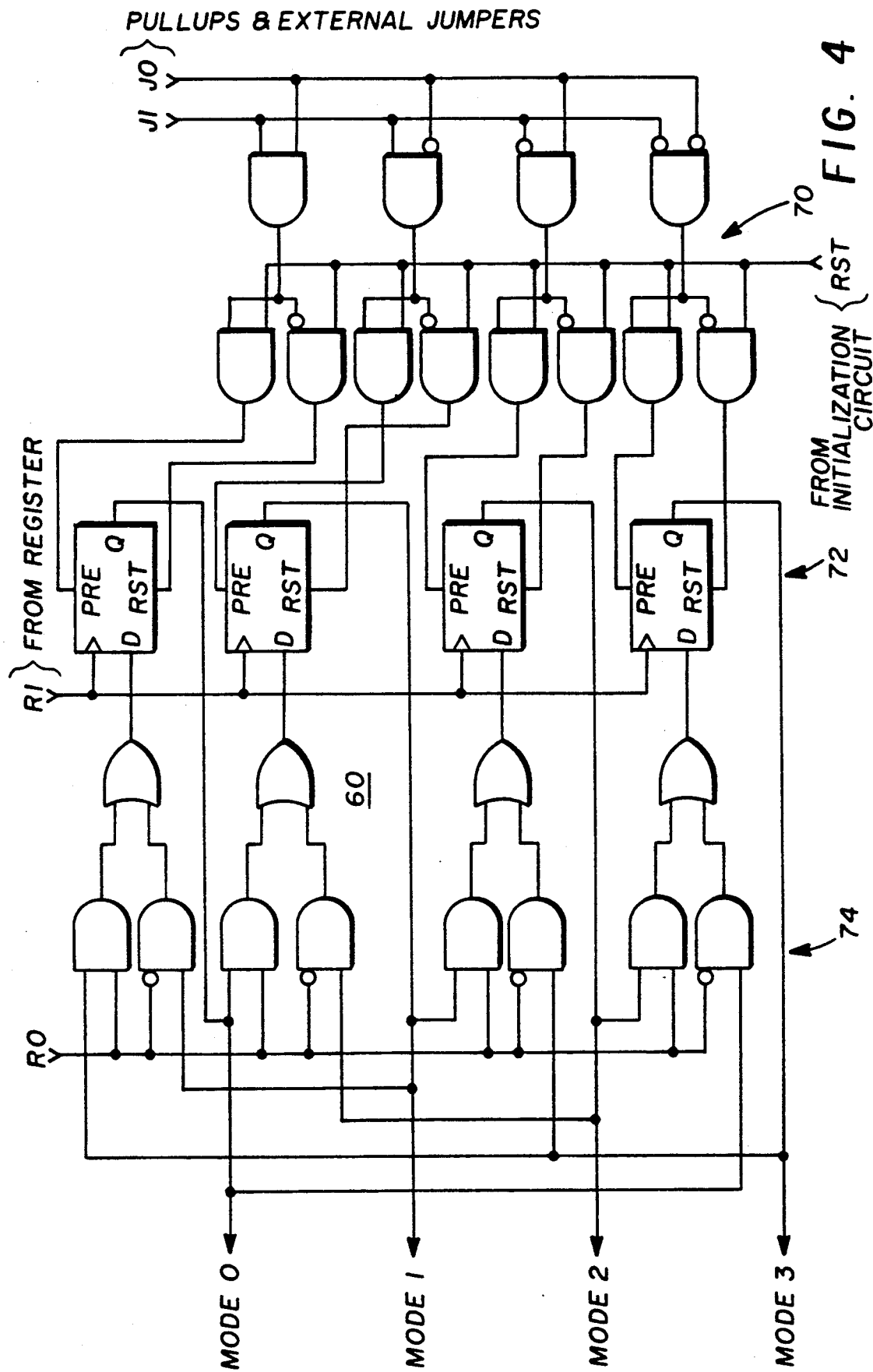

MULTI-MODE VIDEO STANDARD SELECTION CIRCUIT AND SELECTION METHOD

BACKGROUND OF THE INVENTION

1. Field of the Invention

The present invention is directed to a video standard selection circuit which selects between a default video standard and one of multiple video standards indicated by a user and, more particularly, to a system in which a state machine sets a video standard mode to a default mode and then cycles through possible video modes providing a user an opportunity to select a desired mode other than the default mode.

2. Description of the Related Art

In the design of video systems, adherence to several video signal standards may be required, particularly for video systems which will be used in more than one country. In some cases, a particular video unit, such as a compact video disk player, may only require adherence to one signal standard, another unit of the same system may require adherence to a different standard while a third unit of the same system may need to be switchable between three or more standards. As an example, consider an application specific integrated circuit (ASIC), manufactured by the same or different manufacturers, which will be used in several systems such that the ASIC must adhere to B-PAL, M-NTSC and SECAM video standards. If a particular system that uses this integrated circuit is to be used primarily in the M-NTSC environment, then it should default to the M-NTSC standard. However, another system using the same integrated circuit design may be used primarily in the B-PAL environment and thus should default to the B-PAL standard. In addition, systems using this integrated circuit may be required to switch among several different standards but default to the same standard each time they are powered up. As a result, means is needed to specify the standard to which an application specific integrated circuit defaults upon power up and means is needed to switch the operating mode of the integrated circuit between more than one standard after power up, if so desired. One method of selecting between one of two default modes and allowing overriding of the default mode by the user is to provide a default pin which may be either left open circuit or tied to ground. When the signal from the default pin is combined by an Exclusive-Or circuit with a programmable bit which can be set by a user, the user will be allowed to override whichever default setting is selected. However, such a simple circuit does not allow default to more than two standards or the selection by the user between three or more standards when overriding a particular default selected. What is needed is the ability default to several different standards and to selectably override the default.

SUMMARY OF THE INVENTION

It is an object of the present invention to provide a video standard selection circuit which selectably defaults to one of at least three video standards.

It is another object of the present invention to provide the user of a video device, such as a compact disk player, the ability to easily select between three or more video standards and override any default selected.

It is a further object of the present invention to allow a default standard to be selected at the time of manufacturing from among three or more selectable standards.

It is also an object of the present invention to allow the mode selection software to be independent of the default selection mode at the time of manufacture.

The above objects can be attained by a first embodiment that provides logic to select between one of three or more user entered video standards and one or more selectable default video standards. A separate microprocessor presents the options to the user and provides the selection to storage connected in the logic. A second embodiment includes a state machine that sets the output of a mode selection circuit to a default standard from among two or more standards specified at the factory. The state machine, if the video picture produced is not correct, at instigation of the user, can then step through the available modes as desired allowing the user to indicate what standard should be used.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a block diagram of the state machine 40; and

DESCRIPTION OF THE PREFERRED EMBODIMENTS

Figure 1:
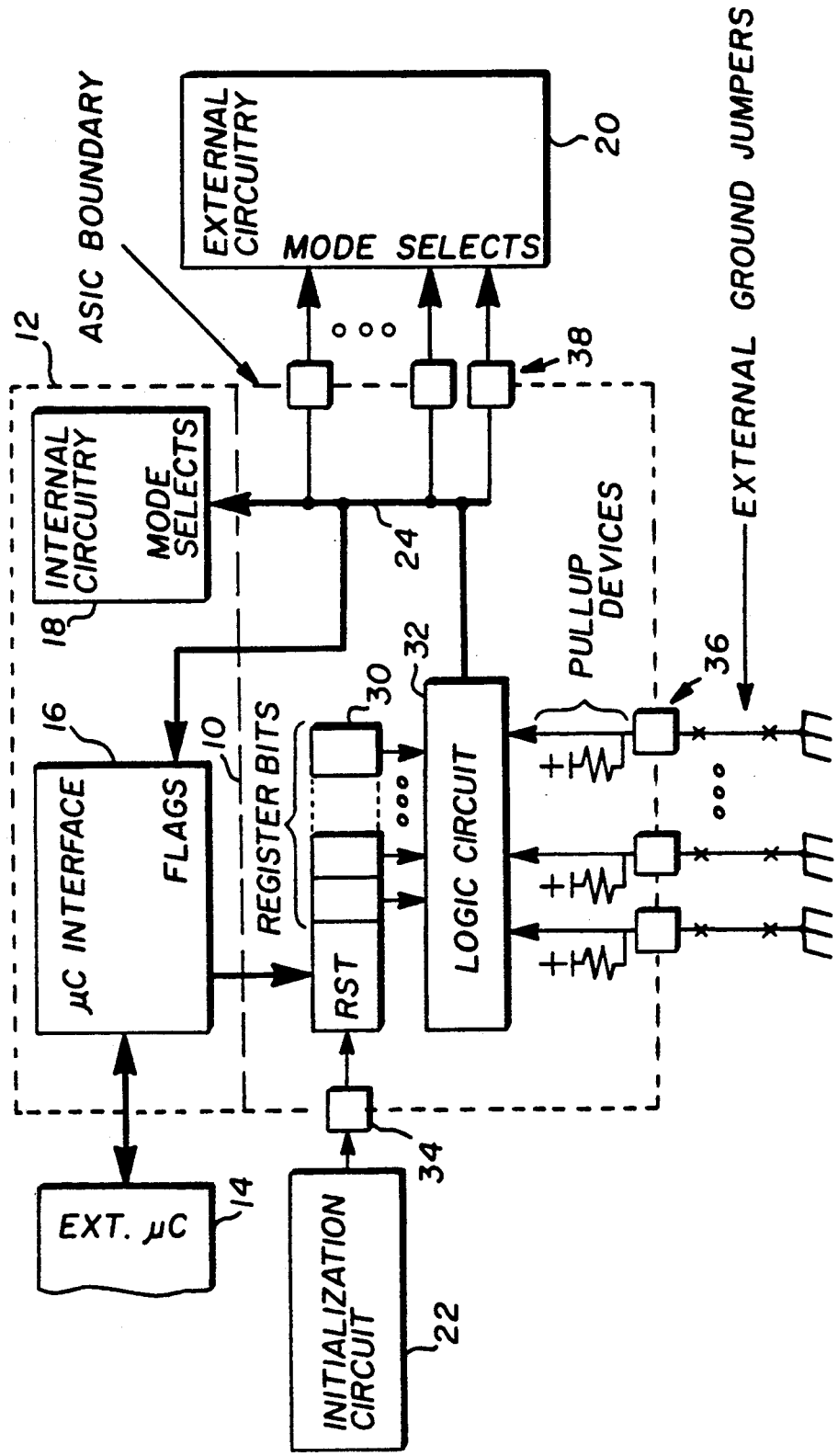
FIG. 1 illustrates a first embodiment of the present invention.

FIG. 1 illustrates a first embodiment of the present invention 10 in which a logic circuit selects between a selectable default standard and a default standard input by the user. In this embodiment, an application specific integrated circuit 12, which is connected to an external microprocessor 14, includes an internal microprocessor interface 16 and internal circuitry 18 which performs different functions depending on the video standard selected. For example, the B-PAL mode produces a higher resolution picture signal at a lower frame rate than M-NTSC mode. In addition, external circuitry 20 can also be provided which also performs operations responsive to the mode selected. The present invention 10 includes a register 30 which is set to a defined initial state by an initialization circuit 22 through a pin 34. A logic circuit 32 receives signals from the register 30 and from external pins 36 which are used to select the default video standard when the application specific integrated circuit 12 is manufactured. The external pins 36 are pulled to a logic one level internally, and may be forced to a logic zero level by the installation of external jumpers to ground. It is preferred that each unique combination of jumpers on these pins 36 specify a unique mode for the default mode. Thus, these pins 36 may be thought of as representing the digits of a binary number where each value of such binary number specifies a particular default mode. This uses the minimum number of pins that are required to uniquely specify a given number of modes. However, each pin may instead be dedicated to a particular default mode. In general this would require more pins, but only one jumper would need to be installed. Trilevel pins could also be used to reduce the number of pins dedicated to default selection.

During operation when the initialization signal occurs the register 10 is cleared and the logic circuit 32 outputs the default standard set by the default pins 36 over internal bus 24 and through output pins 38. If the default standard is not the correct video standard for the display equipment being used, the user must activate a mode selection program in the microprocessor 14. The mode selection program presents the user with the options (a menu, for example) and, based on the selection, loads register 30 with a three bit value indicating the selection to the logic circuit 32. The logic circuit 32 then overrides the default and produces a mode selection signal as specified by the user. The selected mode fed back to the interface 16 by the internal bus 24 is also available to the microprocessor 14 for review by the user at anytime.

The logic of logic circuit 32 can be specified using a truth table as set forth in Table 1 below.

TABLE 1

| EXTERNAL PINS | | REGISTER BITS | | OUTPUTS | | | |
|---|---|---|---|---|---|---|---|
| J1 | J0 | B1 | B0 | MODE0 | MODE1 | MODE2 | MODE3 |
| 0 | 0 | 0 | 0 | 1 | 0 | 0 | 0 |
| 0 | 0 | 0 | 1 | 0 | 1 | 0 | 0 |
| 0 | 0 | 1 | 0 | 0 | 0 | 1 | 0 |
| 0 | 0 | 1 | 1 | 0 | 0 | 0 | 1 |
| 0 | 1 | 0 | 0 | 0 | 1 | 0 | 0 |
| 0 | 1 | 0 | 1 | 0 | 0 | 1 | 0 |
| 0 | 1 | 1 | 0 | 0 | 0 | 0 | 1 |
| 0 | 1 | 1 | 1 | 1 | 0 | 0 | 0 |
| 1 | 0 | 0 | 0 | 0 | 0 | 1 | 0 |
| 1 | 0 | 0 | 1 | 0 | 0 | 0 | 1 |
| 1 | 0 | 1 | 0 | 1 | 0 | 0 | 0 |
| 1 | 0 | 1 | 1 | 0 | 1 | 0 | 0 |
| 1 | 1 | 0 | 0 | 0 | 0 | 0 | 1 |
| 1 | 1 | 0 | 1 | 1 | 0 | 0 | 0 |
| 1 | 1 | 1 | 0 | 0 | 1 | 0 | 0 |
| 1 | 1 | 1 | 1 | 0 | 0 | 1 | 0 |

From the above truth table the necessary logic can be produced in a number of different ways by a person of ordinary skill in the art using conventional logic gates and conventional logic design tools such as Idea Station available from Mentor Graphics.

Figure 2:
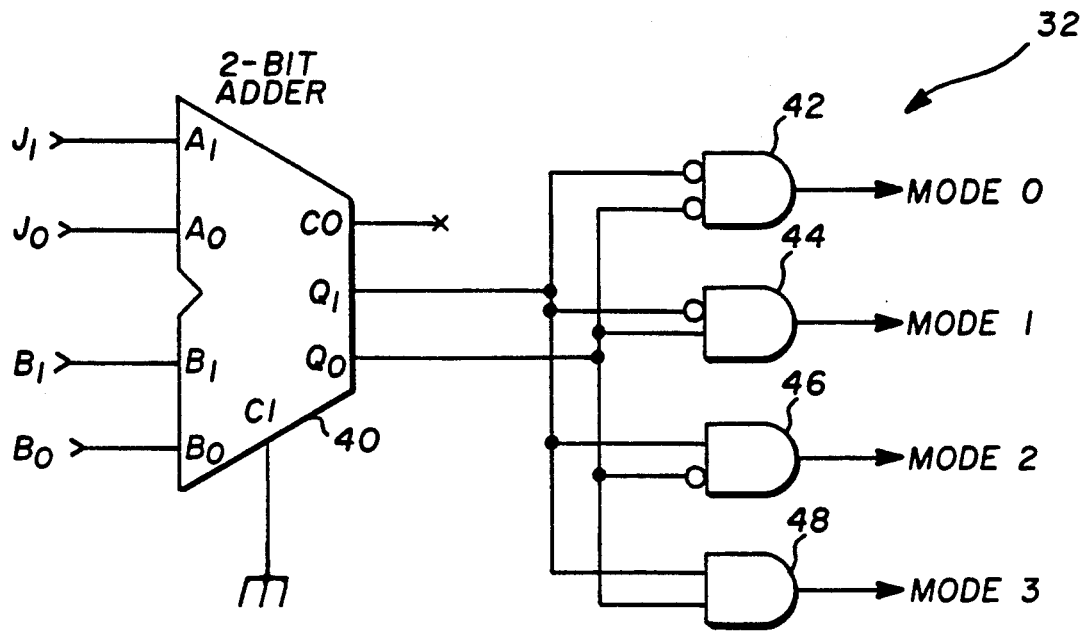
FIG. 2 illustrates the details of the logic circuit 32 of FIG. 1.

FIG. 2 illustrates an implementation of the logic circuit 32 of FIG. 1 in accordance with Table 1. The logic 32 includes a two bit adder 40 which adds the binary values of the external pins 36 and from the register 30. The result is supplied to AND gates 42-48 some of which have their inputs inverted and which produce four different mode signals. Rather than the circuit of FIG. 2 the logic circuit 32 can also be implemented as a look up table stored in a ROM.

Figure 3:
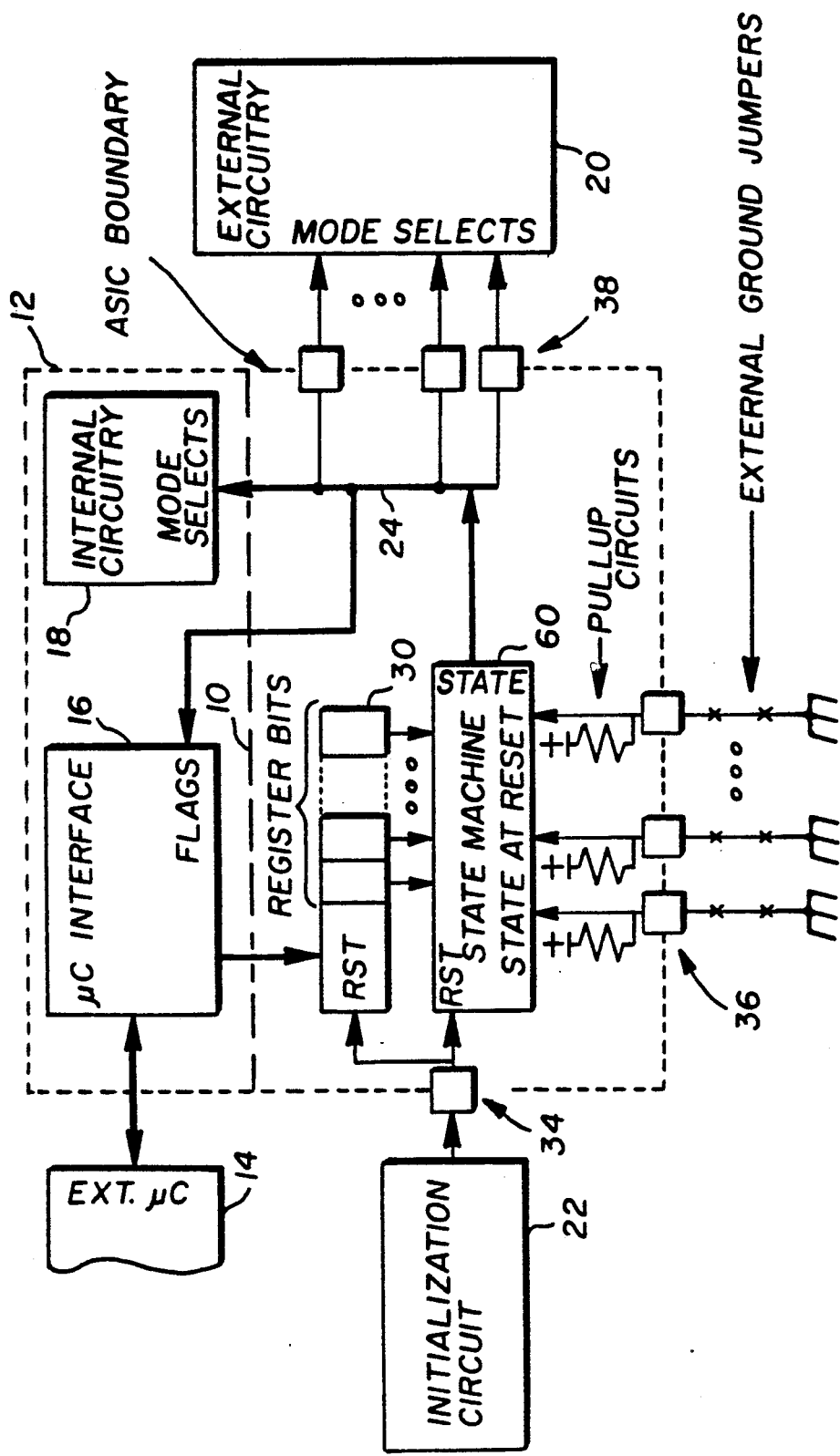
FIG. 3 illustrates a second embodiment in which a state machine 40 is substituted for the logic circuit 32.

As an alternate to placing the mode selection incrementation in the microprocessor 14, a second embodiment as illustrated in FIG. 3 can be implemented. In this embodiment, a state machine 60 is substituted for logic circuit 32. When the external initialization occurs, the reset is applied to the state machine 60 which causes the state machine 60 to enter a state corresponding to the default selection indicated through the default selection pins 36. If the user does not initiate a step or mode change in the state machine 60, the state output by the state machine 60 is the default state. If the user initiates stepping through the state sequence, the state machine 60 steps through the states until the user indicates that the correct default has been found.

A typical sequence of operation of the invention illustrated by FIG. 3, with respect to an application specific integrated circuit 12 used to produce television signals from a compact disk, starts with the user turning on the compact disk player, inserting a compact disk and initiating a picture display. When the player is turned on the state machine 60 selects the default and when the disk is inserted a picture is produced using the default mode of processing. The user then looks at the picture and if the picture is scrambled or unrecognizable, the user depresses a standard selection key or button found on the player. The external microprocessor 14 upon detection of the standard selection key depression communicates to the state machine 60 through the interface 16 and register 30 that stepping through the states is desired. The state machine 60 steps to the next standard in the sequence outputting the appropriate mode selection bits over bus 24. The mode selection bits cause the internal 18 and external 20 circuitry to produce a picture in accordance with the newly selected standard. The microprocessor 14 then waits for a period of time for the user to view the picture produced and determine whether the appropriate standard has been produced. If the appropriate standard has not been selected by the state machine 60, the user does nothing and the microprocessor 14 after an interval of time communicates to the state machine 60 through the interface 16 and the register 30, so that the state machine 60 steps to the next state. This stepping through the states where a new picture is produced on the display continues until the user sees a picture correctly displayed at which point the user again presses the standard selection key. The pressing of the standard selection key results in the microprocessor 14 indicating to the state machine 60 through the interface 16 and register 30 that the present state is the desired state. The state machine 60 then remains in this desired state until a reset condition occurs or the standard selection key is again depressed. As an alternative, the state machine 60 could be stepped to the next state each time the user depresses the standard selection key until the correct picture is displayed and the user stops depressing the standard selection key, rather than having the state machine 60 step through the states with a delay in between steps. The present embodiment eliminates the need for program switching in the external microprocessor 14 and allows the same program to be used regardless of the standards implemented by the ASIC.

Figure 5:
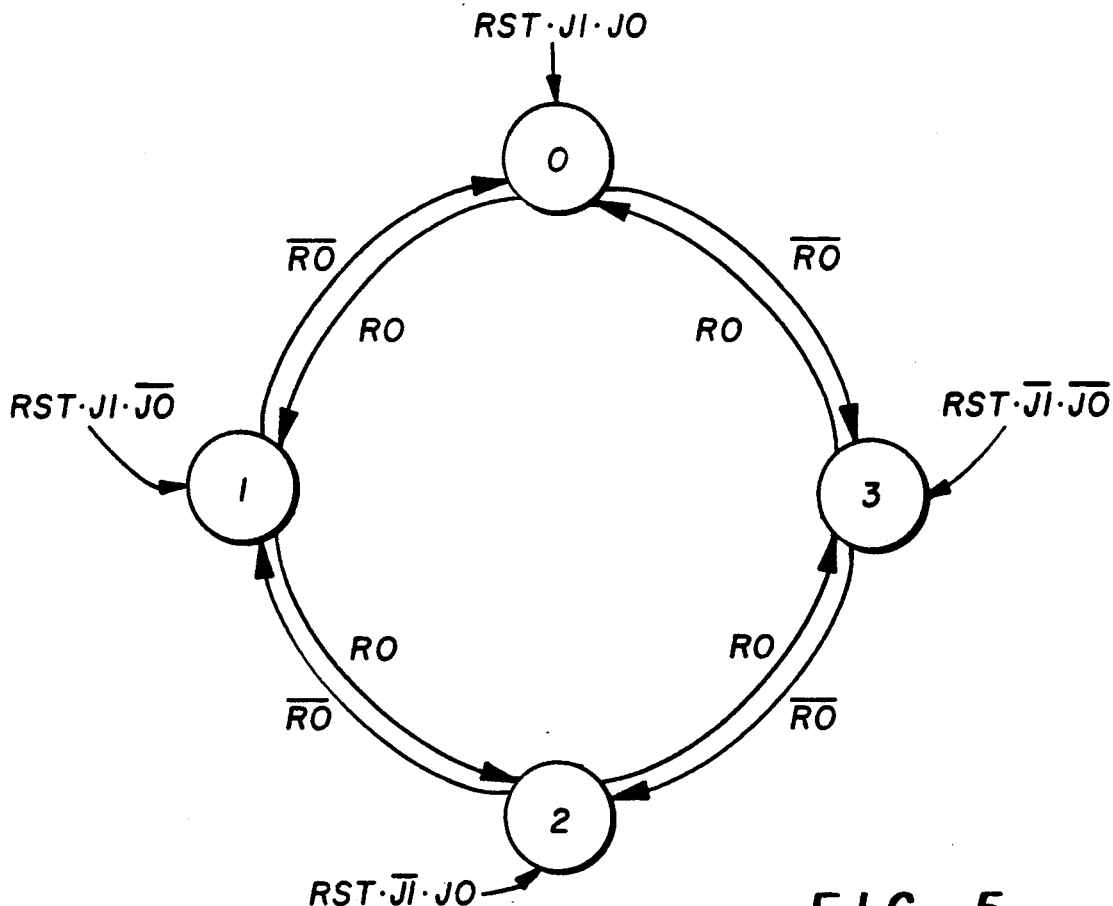
FIG. 5 depicts the states of a state machine having four states or selectable standards.

The state machine 60 could be implemented as a small microprocessor or as a combination of a counter, multiplexer and a logic circuit. A preferred embodiment of the state machine 60 as a logic circuit with state storage is illustrated in FIG. 4. The state machine 60 illustrated in FIG. 4 is an example of what is called a "one-hot" state machine 60 in which only one output is active at any one time. The machine 60 is divided into three circuit sections 70, 72 and 74. Circuit 70 recognizes which default selection has been made and sets the machine in the default state whenever the circuit is reset by, for example, turning on the device. Circuit 72, comprising D flip flops, stores the current state and the appropriate flip flop outputs the default mode after a reset. Circuit 74 recognizes the current state and moves the machine from the current state to the next state responsive to the rising edge of a signal from the bit R1 of the register 30. The direction of the state transition is controlled by the R0 bit from register 30. The operation of the circuit of FIG. 4 will be further explained with reference to the state diagram of FIG. 5. When the reset signal occurs the machine 60 starts in the default mode state. For example, if the default pins are J1 and J0 and the reset signal occurs the machine is initialized in default mode/state 3. Once in state 3 a two cycle write to register 30 is necessary to change to a different state. In the first write, the value in bit R0 is set to the direction of the state transition and R1 is set low. That is, when R0 is high the state transition direction is counter clockwise and when R0 is low the direction is clockwise. In the current example if R0 is high the next state transition will be from state 3 to state 0. When the second write to register 30 occurs R0 is held at the desired direction value and R1 is set high. Upon the rising edge of the transition of R1 from low to high the state transition occurs. That is, R1 acts as the clock of state machine 60. As long as R0 is kept at the same value each time a low to high transition of R1 occurs, the state moves in a counter clockwise direction. In the present example the states would be 3, 0, 1, 2, 3, ... .

An invention has been described which allows easy specification of a default video standard from among several standards for components, subsystems or systems which may be required to support several video standards. The invention also allows easy overriding of the default selection allowing the user to select another standard.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A video standard mode selection circuit, comprising:

default means for setting one of three or more default standards as a default video standard;
   storage means for storing a video standard selection made by a user as a selected standard; and
   override means for overriding the default standard and outputting the user selected standard when the user selects a standard.

2. a circuit as recited in claim 1, wherein said storage means comprises a register reset by a reset signal.

3. A circuit as recited in claim 1, wherein said override means comprises a logic circuit receiving at least two external default selection signals and connected to said storage means.

4. A circuit as recited in claim 3, wherein said logic circuit comprises:

an adder connected to receive the default video standard and a selected standard;
   a first AND gate with inverted inputs connected to said adder;
   a second AND gate with one input inverted and connected to said adder;
   a third AND gate with one input inverted and connected to said adder; and
   a fourth AND gate connected to said adder.

5. A video standard mode selection circuit, comprising:

default means for setting one of two or more default standards as a default video standard;
   storage means for storing a video standard selection made by a user as a selected standard; and
   override means for overriding the default standard and outputting the user selected standard when the user selects a standard, said override means comprising a state machine receiving an initialization signal and at least two default selection signals and connected to said storage means.

6. A circuit as recited in claim 5, wherein said state machine outputs the default mode upon power up and steps through two standards stopping on the desired standard when the user initiates standard selection.

7. A circuit as recited in claim 5, wherein four standards are selectable by the user, said default means comprises default pins, said storage means comprises a register and said state machine comprises:

a default logic circuit connected to said default pins and determining a default mode;
   flip flops connected to said default logic circuit and to said register; and
   state logic connected to said register and said flip-flops and determining a state transition direction and a current mode.

8. A method of video standard mode selecting comprising the steps of:

(a) outputting a default video standard specified externally;
   (b) stepping through selectable video standards if initiated by user and allowing the user to select a standard; and
   (c) outputting the selected standard.

9. A method as recited in claim 8, wherein step (b) includes:

(1) presenting a video picture to the user at each step; and
   (2) storing the selection when the user indicates the picture is correctly displayed.

* * * * *